(12) United States Patent
Ono et al.

(10) Patent No.: US 7,861,815 B2
(45) Date of Patent: Jan. 4, 2011

(54) MOTORCYCLE

(75) Inventors: Takashi Ono, Shizuoka (JP); Yasunobu Kanou, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 254 days.

(21) Appl. No.: 12/128,595

(22) Filed: May 28, 2008

(65) Prior Publication Data
US 2009/0071741 A1 Mar. 19, 2009

(30) Foreign Application Priority Data
Sep. 14, 2007 (JP) .............................. 2007-239288

(51) Int. Cl.
*B60K 1/00* (2006.01)
(52) U.S. Cl. ...................... 180/219; 280/78.1
(58) Field of Classification Search .................. 180/219; 296/78.1
See application file for complete search history.

(56) References Cited

U.S. PATENT DOCUMENTS

| | | | | |
|---|---|---|---|---|
| 6,889,788 | B2 * | 5/2005 | Hakamata et al. | 180/219 |
| 7,028,800 | B2 * | 4/2006 | Yagisawa et al. | 180/219 |
| 7,316,285 | B2 * | 1/2008 | Kimori et al. | 180/219 |
| 7,334,556 | B2 * | 2/2008 | Wachigai et al. | 123/195 HC |
| 7,422,084 | B2 * | 9/2008 | Mochizuki et al. | 180/227 |
| 7,431,114 | B2 * | 10/2008 | Ohira et al. | 180/68.3 |
| 7,461,716 | B2 * | 12/2008 | Hayashi et al. | 180/228 |

FOREIGN PATENT DOCUMENTS

| | | |
|---|---|---|
| EP | 0 295 799 A2 | 12/1988 |
| EP | 1 319 590 A1 | 6/2003 |
| EP | 1 647 478 A1 | 4/2006 |
| JP | 10-329776 | 12/1998 |
| JP | 2002-019663 | 1/2002 |

OTHER PUBLICATIONS

European Search Report for Application No. EP 08 00 9967.4 of Jun. 24, 2008, pp. (5).

* cited by examiner

*Primary Examiner*—Kevin Hurley
(74) *Attorney, Agent, or Firm*—Dickstein Shapiro LLP

(57) ABSTRACT

A motorcycle is provided in which the size of the body frame is restricted from increasing in a vehicle-width direction while enhancing the frame rigidity. The body frame includes a head pipe and left and right front frame sections which extending from the head pipe. The left and right front frame sections have left and right side wall sections which extend in a longitudinal and vertical directions of the vehicle. Left and right side wall sections are disposed on the left and right sides of the engine unit. The engine unit is supported by the left and right side wall sections which have relatively high rigidity, thereby enhancing the supporting rigidity of the engine unit. This type of engine unit support ensures body frame rigidity without widening the space between the left and right body frame sections in a vehicle-width direction.

14 Claims, 18 Drawing Sheets

MOTORCYCLE

PRIORITY INFORMATION

This patent application is based on and claims priority under 35 U.S.C. §119 to Japanese Patent Application No. 2007-239288, filed on Sep. 14, 2007, the entire contents of which is hereby expressly incorporated by reference.

TECHNICAL FIELD

In one aspect, the present invention relates to a motorcycle having a body frame and an engine unit mounted on the body frame. In another aspect, the present invention relates to a body frame for a motorcycle.

BACKGROUND ART

For example, as shown in Japanese Patent Publication JP-A-2002-19663, a scooter-type motorcycle is constructed such that its body frame includes: left and right lower frames made up of pipe extending obliquely downward and rearward from a head pipe; left and right upper frames made up of pipe extending rearward from the head pipe; and a plurality of reinforcing frames for connecting these left and right frames. In this case, in order to secure sufficient frame rigidity, one needs to widen as much as possible intervals between the left and right upper or lower frames in a vehicle-width direction.

However, if the intervals between the left and the right upper or lower frames are widened in a vehicle-width direction in order to enhance the frame rigidity, a problem arises in that the size of the whole vehicle in a vehicle-width direction becomes large, which widens the rider seat width and makes it difficult for a rider to put his or her feet on the ground in a stable manner.

In view of the foregoing, it is an object of the present invention to provide a motorcycle in which the size of the body frame is restricted from increasing in a vehicle-width direction while exhibiting enhanced frame rigidity. It is also an object to provide an improved body frame for a motorcycle.

SUMMARY

A motorcycle according to one embodiment includes: a body frame; an engine unit fixed on the body frame so that an axis of a cylinder is directed generally horizontally; and left and right footrests disposed in a left and a right side of the cylinder, in which the body frame includes a head pipe and left and right frame sections extending from the head pipe, the left and right frame sections include left and right side wall sections extending in a longitudinal direction of the vehicle and in a vertical direction, and the left and right side wall sections being disposed in the left and right side of the engine unit and having a part which overlaps the engine unit when viewed from the lateral side of the vehicle.

Because the left and right frame sections have the left and right side wall sections extending in a longitudinal direction of the vehicle and in a vertical direction, the left and right side wall sections have wide surfaces extending in a longitudinal direction and in a vertical direction. Thereby, surface rigidity of the left and right side wall sections can be enhanced, which ensures frame rigidity without widening an interval between the left and right frame sections in a vehicle-width direction. As a result, the size in a vehicle-width direction of a part of the vehicle in which the engine cylinder is disposed can be reduced. A footrest for a rider is disposed in a side of the part whose size in a vehicle-width direction can be reduced, thereby increasing layout flexibility of the footrest.

Also, the left and right side wall sections are disposed on the left and right sides of the engine unit. This allows the left and right side wall sections with high rigidity to support the engine unit, thereby enhancing rigidity for supporting the engine unit.

In accordance with another embodiment, a motorcycle comprising a body frame, a front fork, and an engine unit is provided, wherein the body frame includes a head pipe positioned at one end of the body frame, a pair of front frame sections comprising opposing side wall members extending substantially obliquely rearward and downward from the head pipe, and a pair of rear frame sections extending substantially rearward and upward from the opposing side wall members. The front fork includes a front wheel at a lower end, a handlebar at an upper end, and a steering shaft interposed between the two. The steering shaft is operatively inserted through and supported by the head pipe. The engine unit is mounted to the body frame so that a portion of the engine unit is disposed between the opposing wall members and a portion extends aft of the wall members in the longitudinal direction of the vehicle. The engine unit is operatively coupled to a rear wheel and includes an engine body supported by the wall members so that an axis of a cylinder of the engine unit extends generally in the longitudinal direction of the vehicle between the wall members.

In yet another aspect of the invention, a body frame for a motorcycle is provided. The body frame comprises a head pipe adapted to receive and operatively support a steering shaft of a front fork, and a pair of frame sections comprising opposing side wall members configured to extend substantially obliquely rearward and downward from the head pipe. In addition, the opposing side wall members include mounting bosses for mounting an engine unit so that i) a portion of said engine unit is disposed between said opposing wall members and a portion extends aft of said wall members in the longitudinal direction of the motorcycle, ii) an axis of a cylinder of the engine unit extends generally in the longitudinal direction of the motorcycle between the wall members, iii) the opposing side wall members cover a cylinder head of the engine unit from the left and right lateral sides, and iv) the engine unit may be operatively coupled to a rear wheel of the motorcycle.

DETAILED DESCRIPTION

Figure 1:
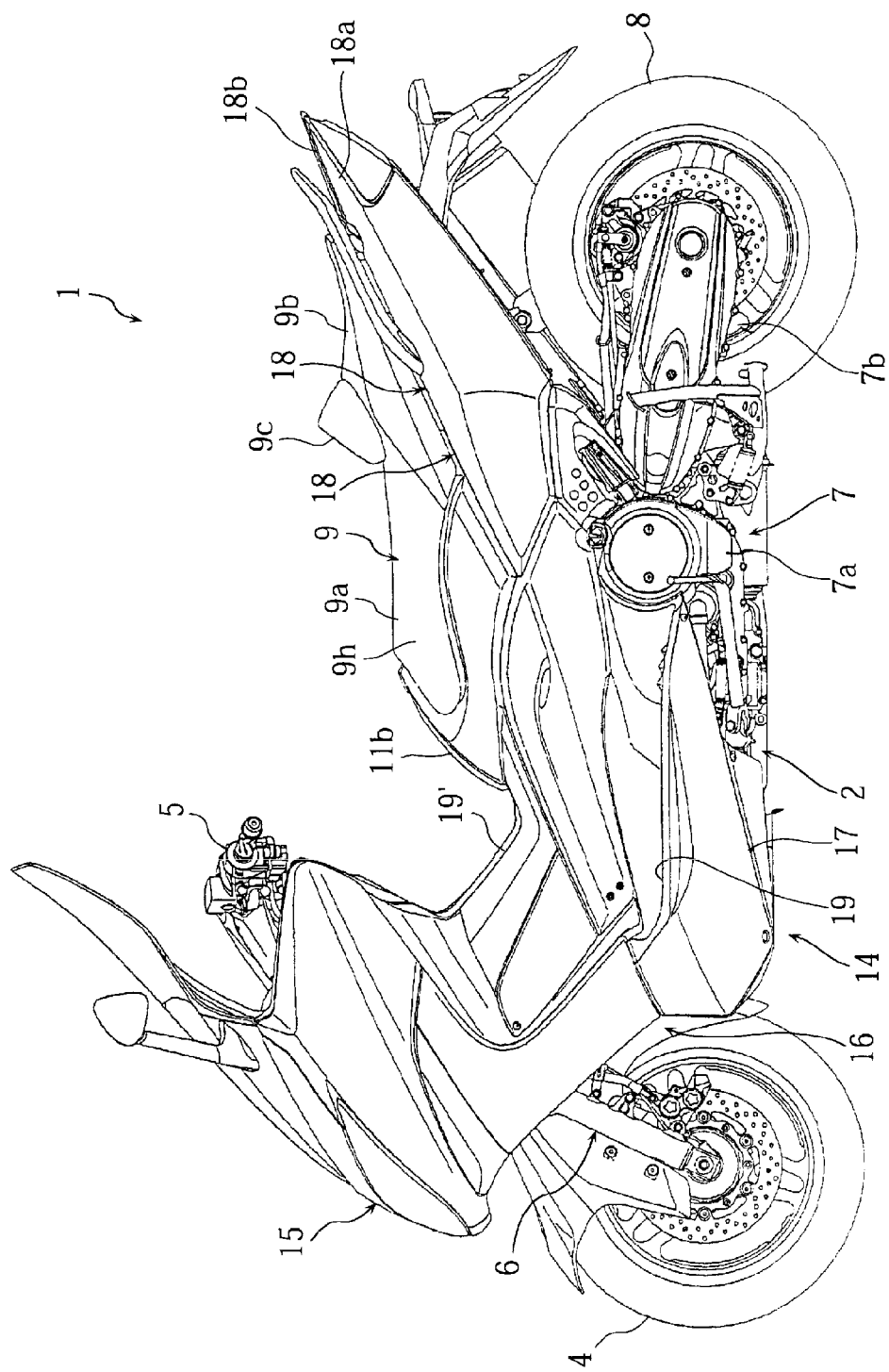
FIG. 1 is a side view of the motorcycle according to an embodiment of the present invention.
Figure 2:
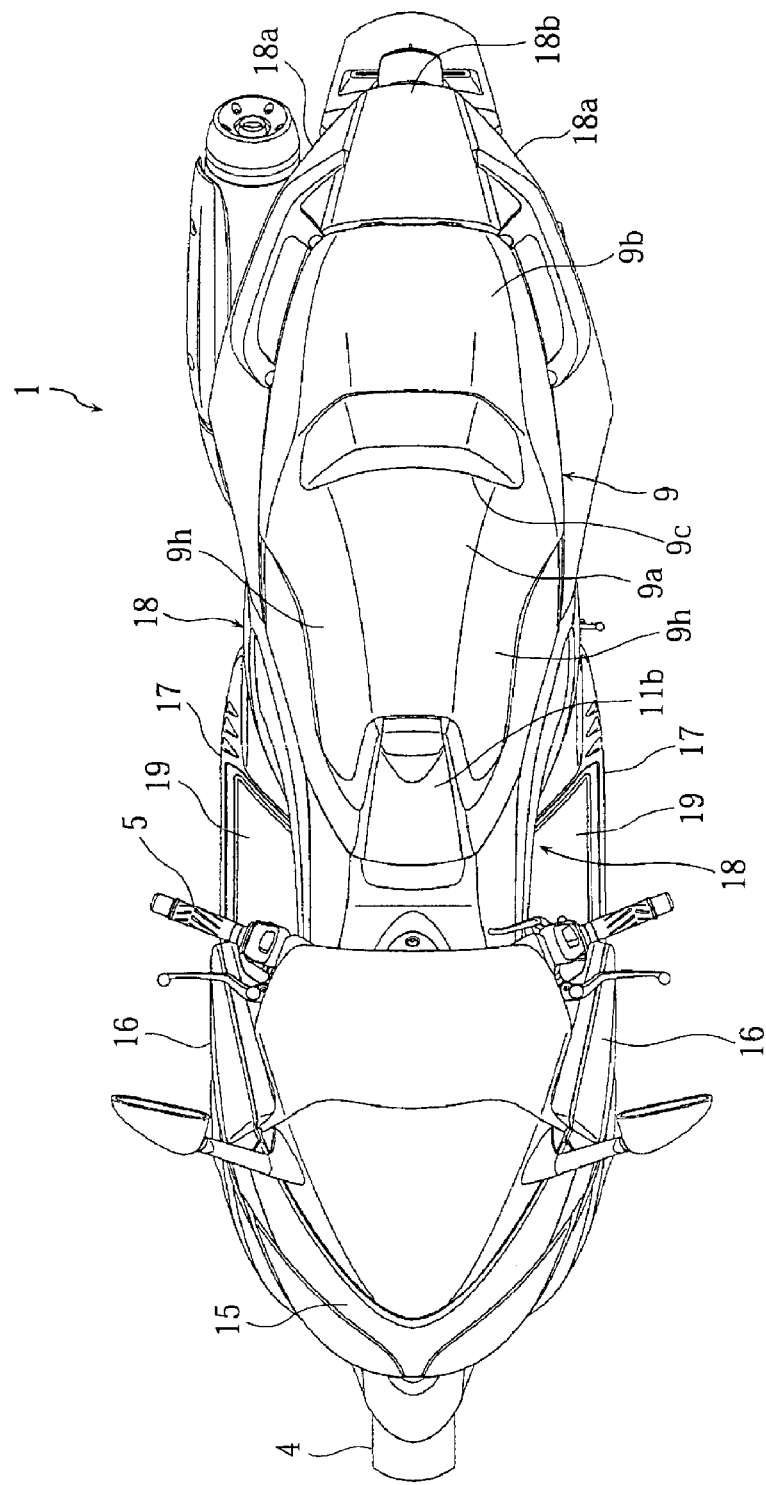
FIG. 2 is a plan view of the motorcycle.
Figure 3:
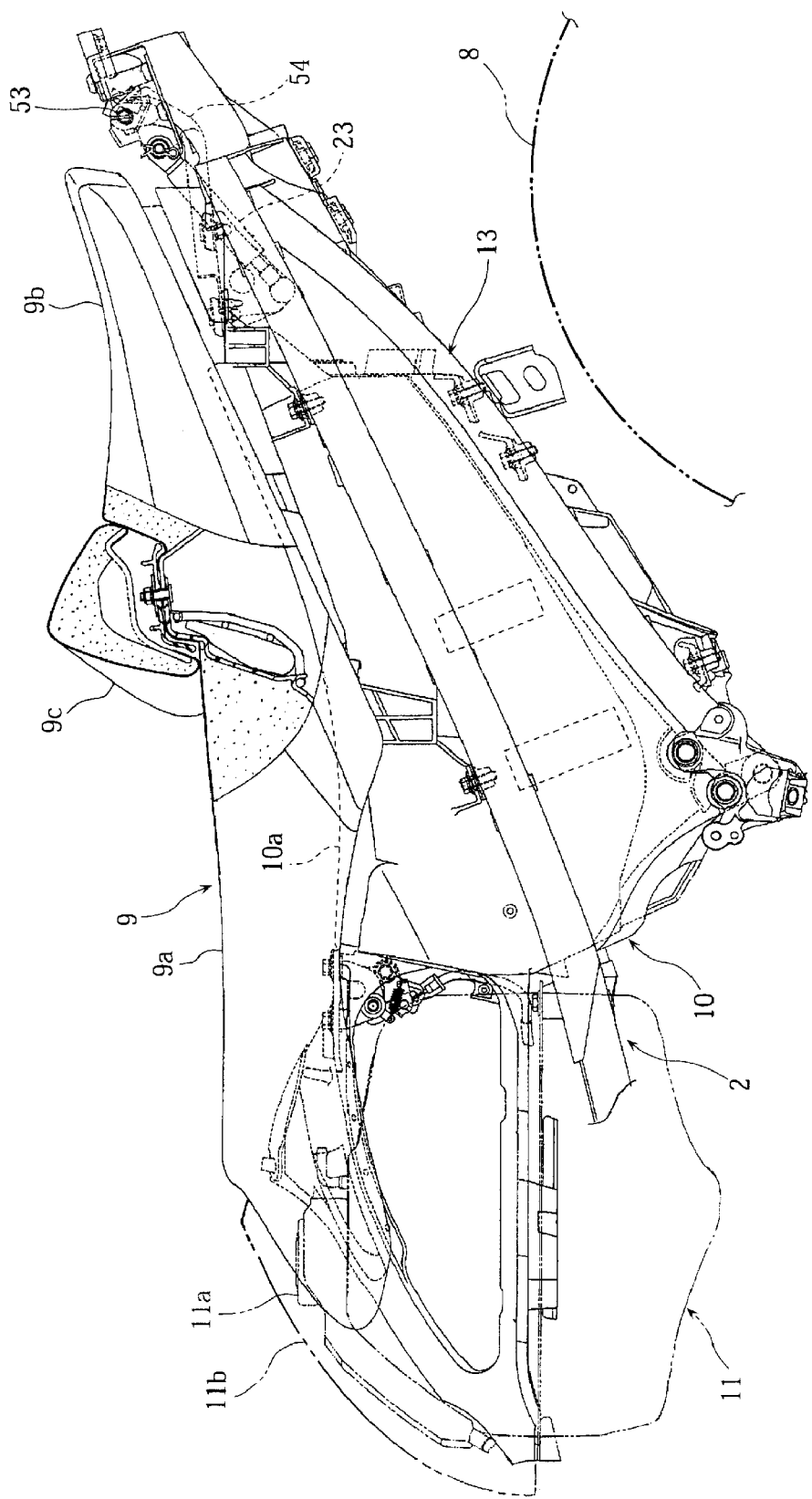
FIG. 3 is a side view of a rear frame section including a storage box of the motorcycle.

Hereinafter, an embodiment of the present invention is described with reference to the attached drawings. The detailed description set forth below in connection with the appended drawings is intended, however, only as a description of exemplary embodiment and is not intended to represent the only embodiment that may be constructed and/or utilized in accordance with the general principles of the present invention.

FIGS. 1 to 12 schematically illustrate a motorcycle according to an embodiment of the invention. The terms "front," "rear," "left," and "right," as used throughout the specification, refer to those directions viewed from a seated rider unless otherwise specified.

In the figures, the reference numeral 1 denotes a scooter-type motorcycle. The motorcycle 1 includes: an underbone type body frame 2; a front fork 6 supported by a head pipe 3 positioned at the front end of the body frame 2 for steering left and right, the front fork 6 having a front wheel 4 at its lower end and a handlebar 5 at its upper end; an engine unit 7 mounted on the center of the body frame 2 in a longitudinal direction, the engine unit 7 having a rear wheel 8 at its rear end; and a seat 9 for two passengers mounted on an upper part of the engine unit 7 on the body frame 2.

The body frame 2 includes the head pipe 3, left and right front frame sections 12, 12 extending obliquely rearward and downward from the head pipe 3, and left and right rear frame sections 13, 13 extending obliquely rearward and upward from the left and right front frame sections 12.

The engine unit 7 includes an engine body 7a fixedly supported by the body frame 2, and a transmission case 7b pivotally supported by the rear end of the engine body 7a for transmitting engine power to the rear wheel 8, which is rotatably supported by the rear end of the transmission case 7b. The engine body 7a has a general structure such that a front wall cylinder body 7e of a crankcase 7d and a cylinder head 7c are disposed in a stacked configuration. The engine body 7a is fixed on the body frame 2 in such a manner that an axis (cylinder axis) of the cylinder body 7e is directed generally horizontally.

The body frame 2 is surrounded by a vehicle body cover 14, which may be made of resin. Other suitable material(s) may be utilized as needed. The vehicle body cover 14 includes: a front cover 15 for covering left, right and front sides of the front fork 6; a leg shield 16 disposed at the rear of the front cover 15 for covering a part in front of a rider's leg; left and right side covers 18, 18 for covering a surrounding part below the seat 9 and left and right sides of the engine body 7a; and left and right under covers 17, 17 for covering the lower sides of the side covers 18.

Low-height left and right footboards 19, 19 forming footrests for a rider are disposed between the left and the right side covers 18 and the left and the right under covers 17. A part of the vehicle body cover 14 between the left and right footboards 19, 19 swells upward in a tunnel shape to form a center tunnel section 19'.

Here, the left and the right footboards 19, 19 are positioned on the left and the right sides of the cylinder body 7e and the cylinder head 7c of the engine body 7a.

The seat 9 is integrally formed with a front seat 9a for the rider and a rear seat 9b for a tandem rider. On a boundary between the front seat 9a and the rear seat 9b, a backrest 9c is disposed for supporting a hip of the rider. A rear end of the seat 9 is pivotally supported around a support shaft 53 via a bracket 54 to open or close an opening 10a of a storage box 10 disposed below. A damper 23 is disposed between the seat 9 and the rear frame section 13.

A fuel tank 11 is disposed in front of the storage box. A fuel cap 11a of the fuel tank 11 is opened or closed by a lid 11b.

The head pipe 3 and the left and the right front frame sections 12, 12 are integrally formed by casting. The left and the right front frame sections 12, 12 have wide left and right side wall sections 12a, 12a which extend in a longitudinal direction of the vehicle and in a vertical direction. The head pipe 3 has left and right head pipe halves 3a, 3a connected to and formed integrally with the left and the right side wall sections 12a, 12a. The left and the right head pipe halves 3a, 3a may be coupled together by bolting as described herein below.

A steering shaft (not shown) of the front fork 6 is inserted into the left and the right head pipe halves 3a, 3a and supported on the head pipe 3 via upper and lower bearings 29a, 29b for steering left and right.

Left and right front coupling boss sections (first coupling boss sections) 3b, 3b are formed at the front edges of the left and the right head pipe halves 3a, 3a. Left and right rear coupling boss sections (second coupling boss sections) 3c, 3c are formed at the rear edges. The front coupling boss sections 3b and the rear coupling boss sections 3c are respectively formed at three locations in the present embodiment, namely both ends and the center in a vertical direction of the left and right head pipe halves 3a.

Left and right upper separated coupling boss sections (third coupling boss sections) 3d, 3d are formed to protrude upward at the upper edges of parts spaced rearward from the left and the right rear coupling boss sections 3c of the left and the right side wall sections 12a, 12a. Also, at the lower edges, left and right lower separated coupling boss sections (also third coupling boss sections) 3e, 3e are formed to protrude downward.

Each pair of the left and the right front coupling boss sections 3b, 3b, the left and the right rear coupling boss sections 3c, 3c, the left and the right upper separated coupling boss sections 3d, 3d, and the left and the right lower separated coupling boss sections 3e, 3e may be operatively fastened by coupling bolts 69.

Left and right flange sections 3f, 3f are formed to protrude forward at the front edges of the left and the right head pipe halves 3a. An attachment frame (not shown) for electrical components is attached to the flange section 3f.

In the present embodiment, between the rear coupling bosses 3c and the separated coupling bosses 3d, 3e, connecting portions of the left and the right side wall sections 12a, 12a and the head pipe halves 3a, 3a include extensions that extend inward in a vehicle-width direction from the upper edges and lower edges of the left and the right side wall sections 12a, 12a so as to bring opposing connecting portions of the side walls into close proximity of one another in this region. In the present embodiment, the extensions of the connecting portions of the left and right side wall sections 12a, 12a that extend inward comprise left and right top wall sections 12b, 12b and left and right bottom wall sections 12c, 12c, which respectively face each other so as to leave a narrow gap between the opposing wall sections so that the body frame exhibits a square cylindrical cross section in this region (see FIG. 10). Thus, in the present embodiment, the portion of the body frame from the separated coupling boss sections 3d, 3e of side wall sections 12a, 12a forward to the rear coupling boss sections 3c, 3c of the head pipe halves 3a, 3a is generally shaped as a square cylinder in cross section.

Figure 10:
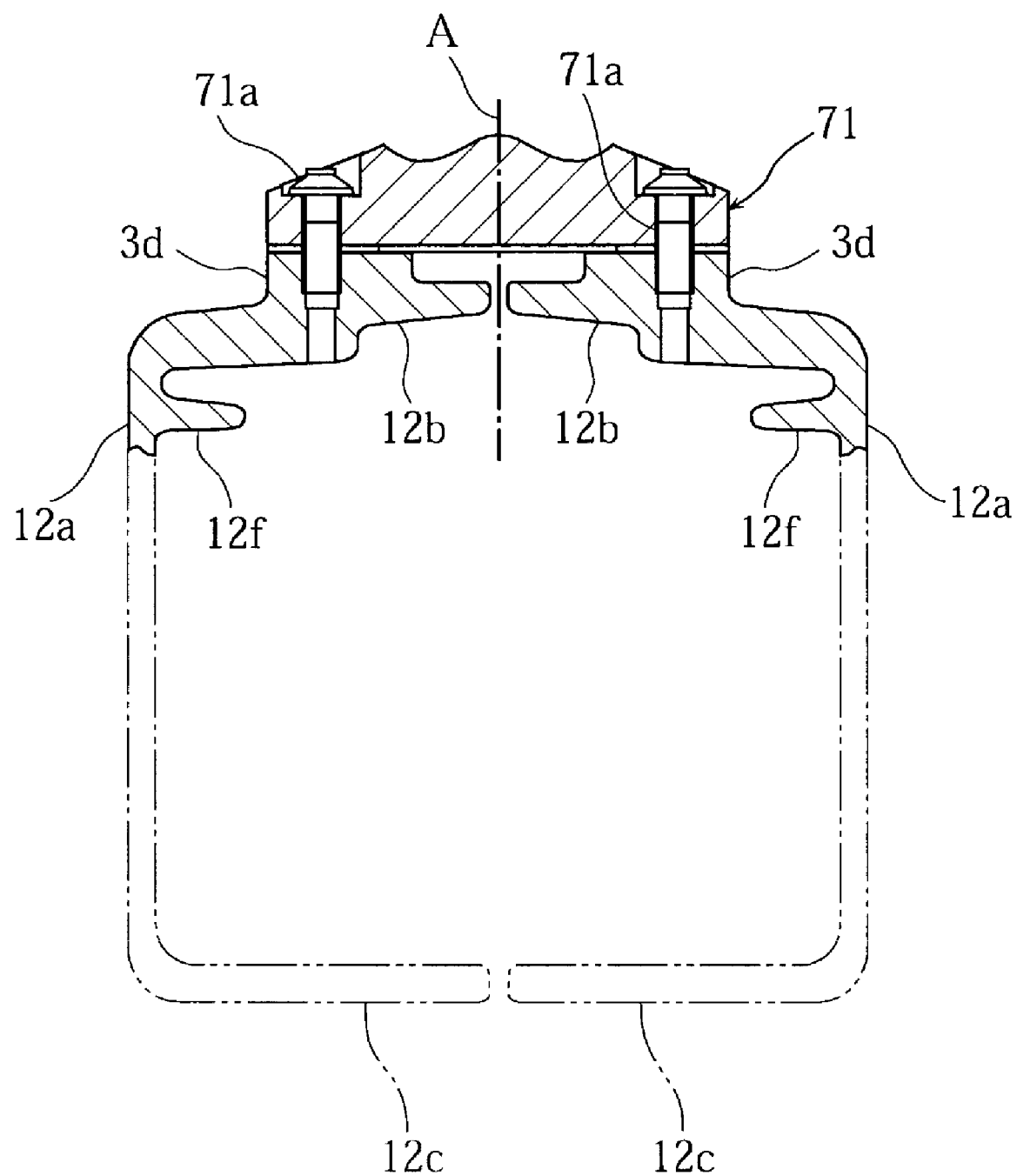
FIG. 10 is a sectional view of a connecting portion of the front frame section connected to the head pipe (taken along the line X-X in FIG. 5).
Figure 11:
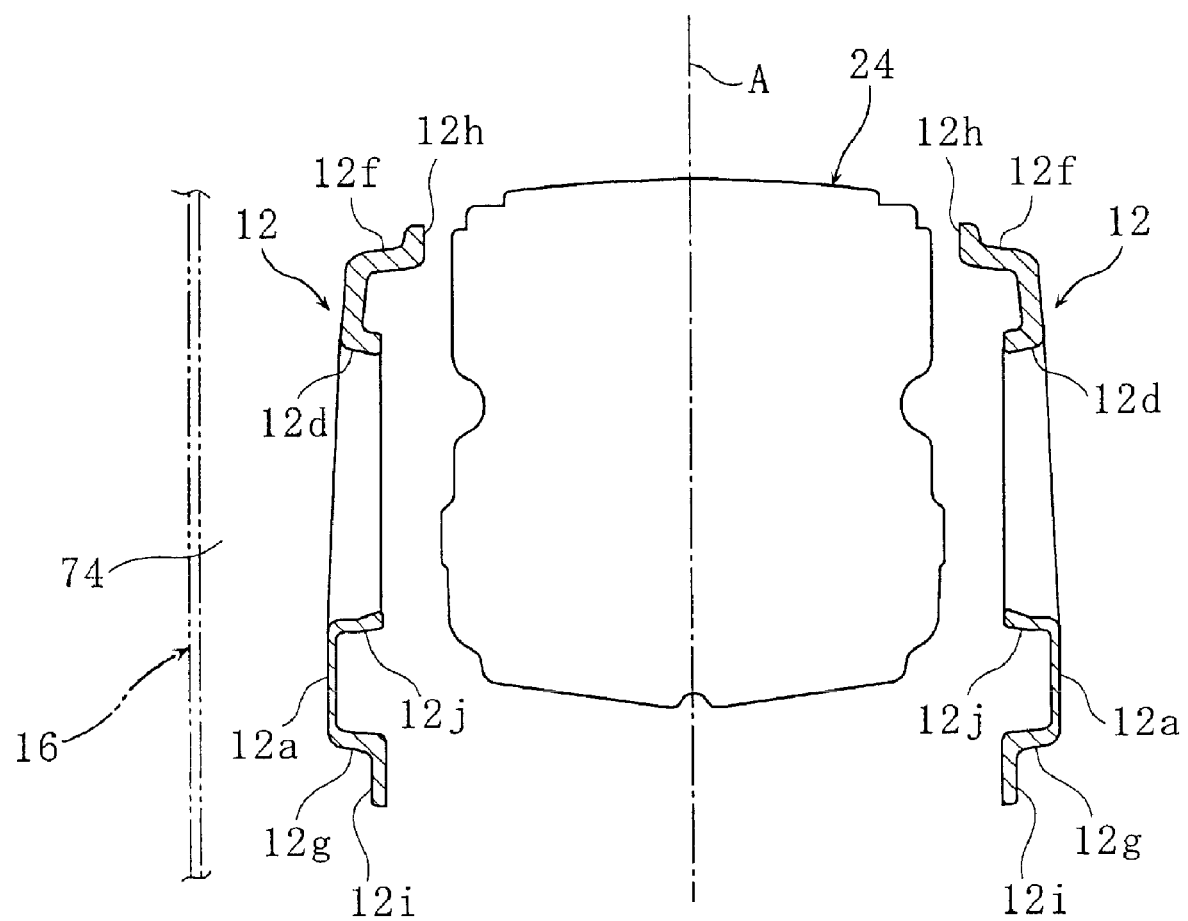
FIG. 11 is a sectional view of the front frame section (taken along the line XI-XI in FIG. 4).
Figure 12:
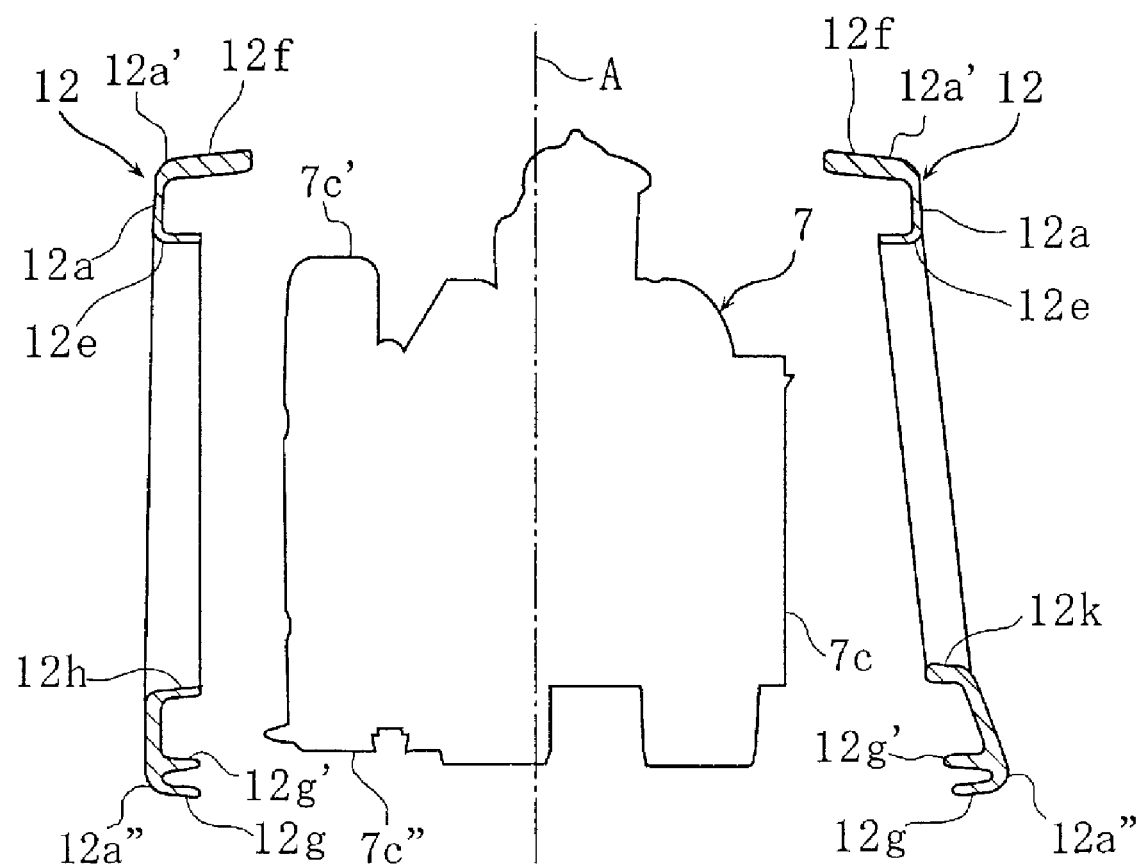
FIG. 12 is a sectional view of the front frame section (taken along the line XII-XII in FIG. 4).

A main switch 71 is fixed on the upper surfaces of the left and the right upper separated coupling boss sections 3d, 3d by a plurality of bolts 71a, as schematically depicted in FIG. 10.

The left and the right side wall sections 12a, 12a cover the cylinder head 7c and the cylinder body 7e of the engine unit 7 from the left and the right sides and cover an air cleaner 24 disposed forward of the engine unit 7 from the left and the right sides.

Front openings 12d, 12d are formed on parts of the left and the right side wall sections 12a, 12a facing a rear part of the air cleaner 24. Rear openings 12e, 12e are formed on parts facing the cylinder head 7c. In this invention, covering the cylinder head 7c from the left and the right sides by the left and the right side wall sections 12a, 12a includes a case that a relatively large opening 12d, as described above, is formed and the cylinder head 7c may be observed from the outside when viewed from a lateral side of the vehicle.

The front and the rear openings 12d, 12e have a relatively large opening area extending both in longitudinal and vertical directions. The front opening 12d is utilized for maintaining an intake system including the air cleaner 24. The rear opening 12e is utilized for maintaining around the cylinder head 7c.

In this case, upper edges 12a' of the left and the right side wall sections 12a, 12a are positioned higher than an upper edge 7c' of the cylinder head 7c, and lower edges 12a" are positioned lower than a lower edge 7c" of the cylinder head 7c, when viewed from a lateral side of the vehicle. On the upper edges 12a' and the lower edges 12a" of the left and the right side wall sections, upper edge ribs 12f, 12f and lower edge ribs 12g, 12g respectively extending inward in a vehicle width direction are formed generally along the whole length thereof in a longitudinal direction (see FIGS. 11 and 12).

In parts of the upper edge rib 12f and the lower edge rib 12g, which face the air cleaner 24, upper ribs 12h, 12h and lower ribs 12i, 12i are formed to extend continuously from inner edges of the left and the right upper edge ribs 12f and the lower edge ribs 12g respectively upward or downward after bending. However, the lower ribs 12i are formed longer than the upper ribs 12h.

In parts of the lower edges 12a", which face the cylinder head 7c, additional lower edge ribs 12g' are formed to become a double rib. In the part facing the cylinder head, the upper edge rib 12f is formed longer than the lower edge rib 12g.

On peripheries of the front and the rear openings 12d, 12e of the left and the right side wall sections 12a, 12a, front peripheral ribs 12j and rear peripheral ribs 12k, respectively extending inward in a vehicle-width direction, are formed. Each front peripheral rib 12j and rear peripheral rib 12k on a side wall section is formed shorter than the upper edge rib 12f.

Figure 4:
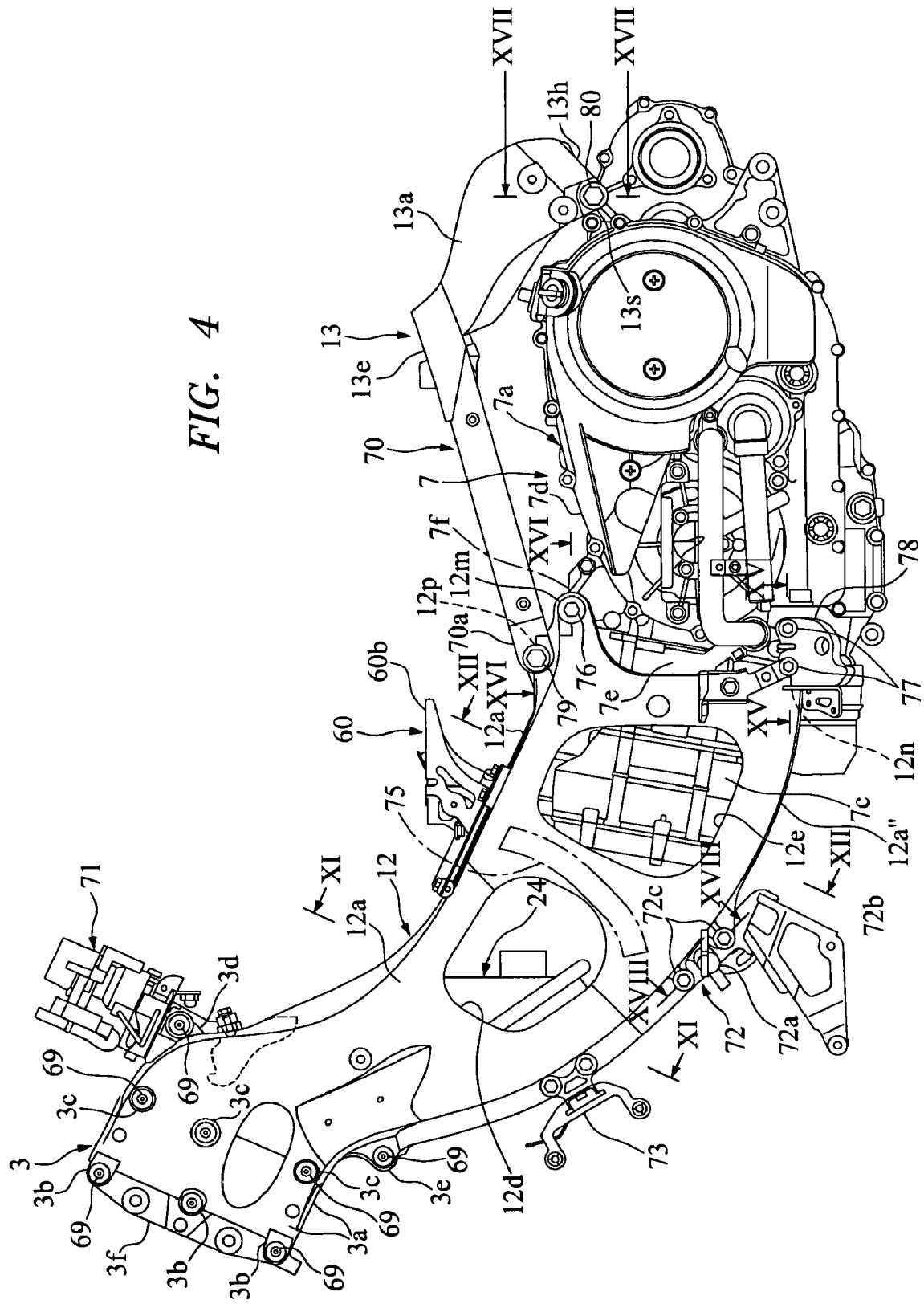
FIG. 4 is a side view of a front frame section of the motorcycle.
Figure 5:
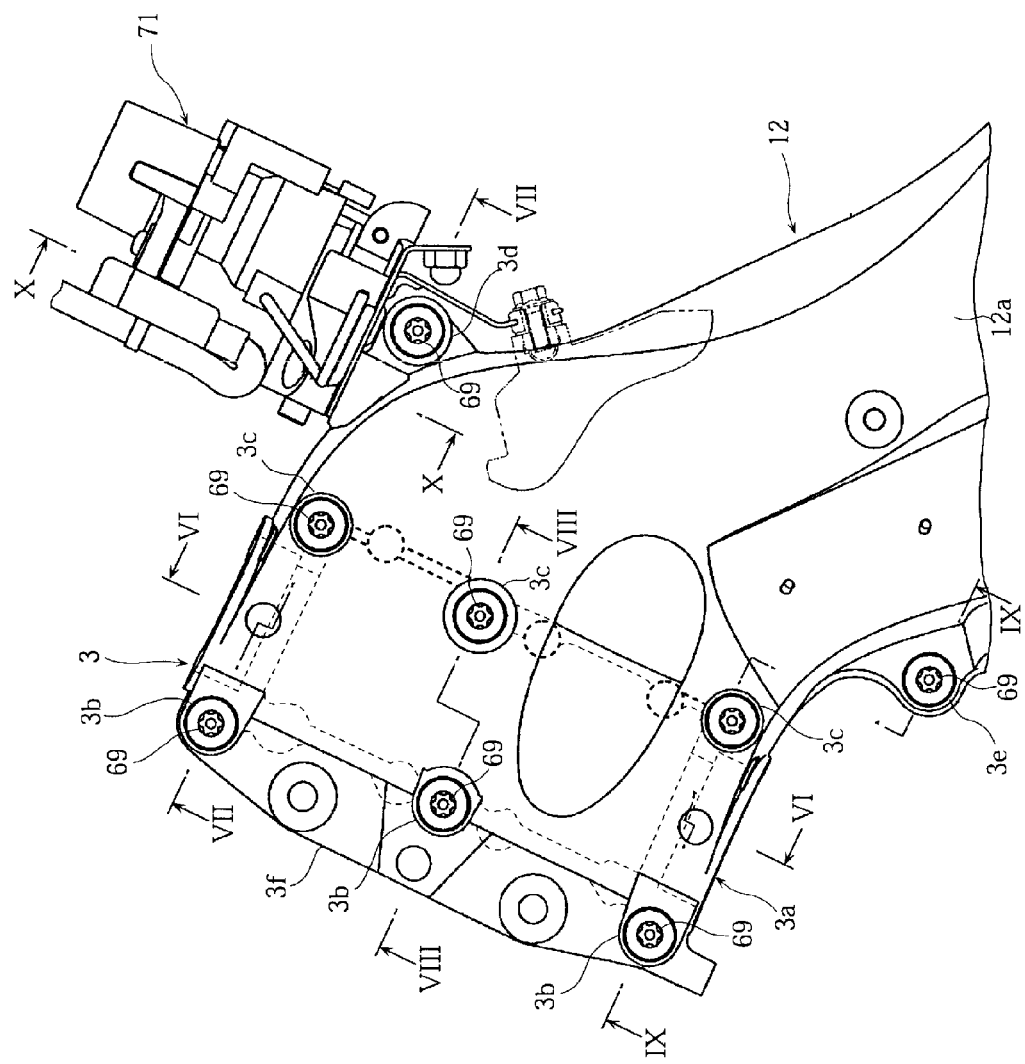
FIG. 5 is a side view of a head pipe formed integrally with the front frame section.
Figure 6:
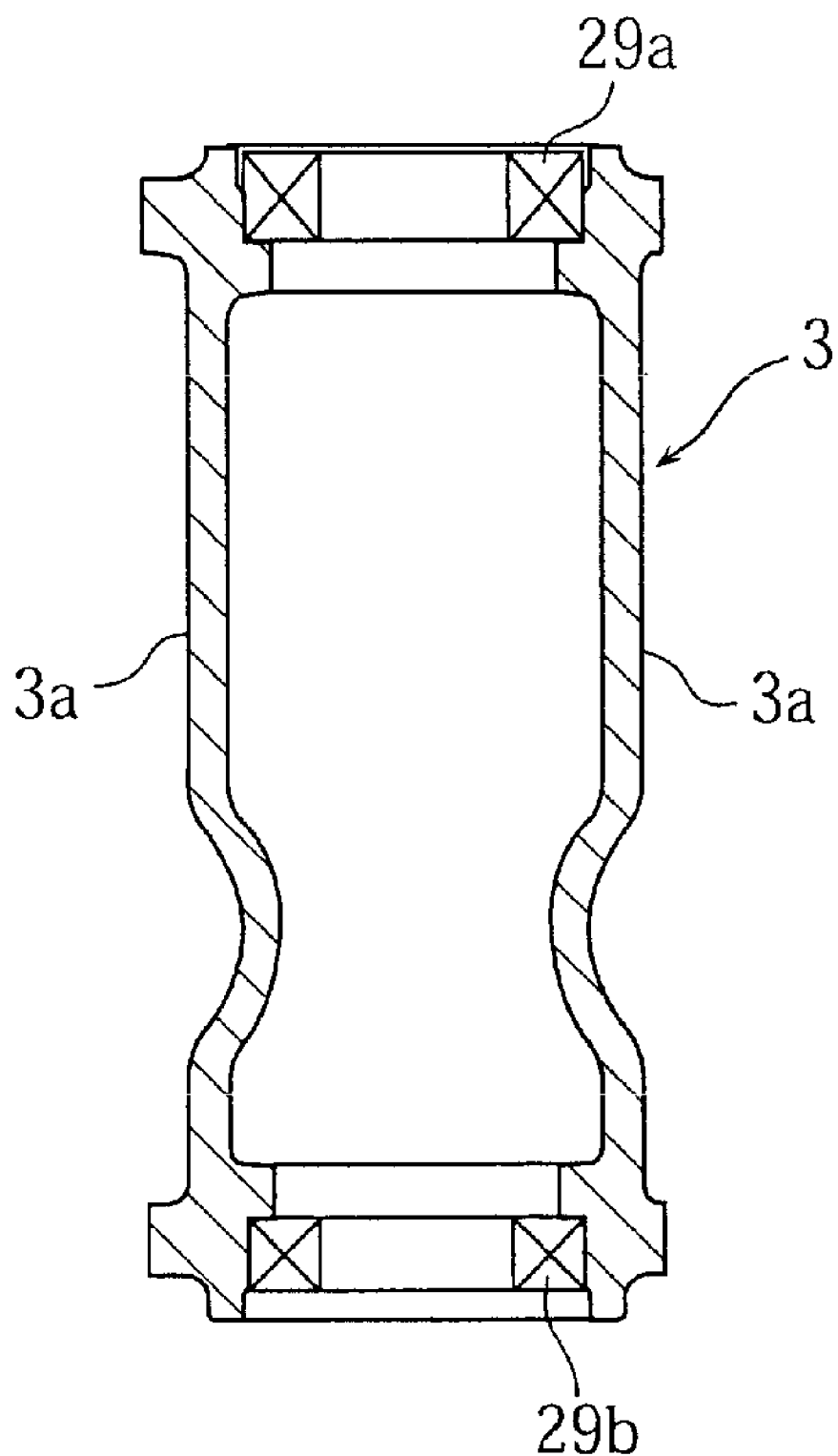
FIG. 6 is a sectional view of the head pipe (taken along the line VI-VI in FIG. 5).
Figure 7:
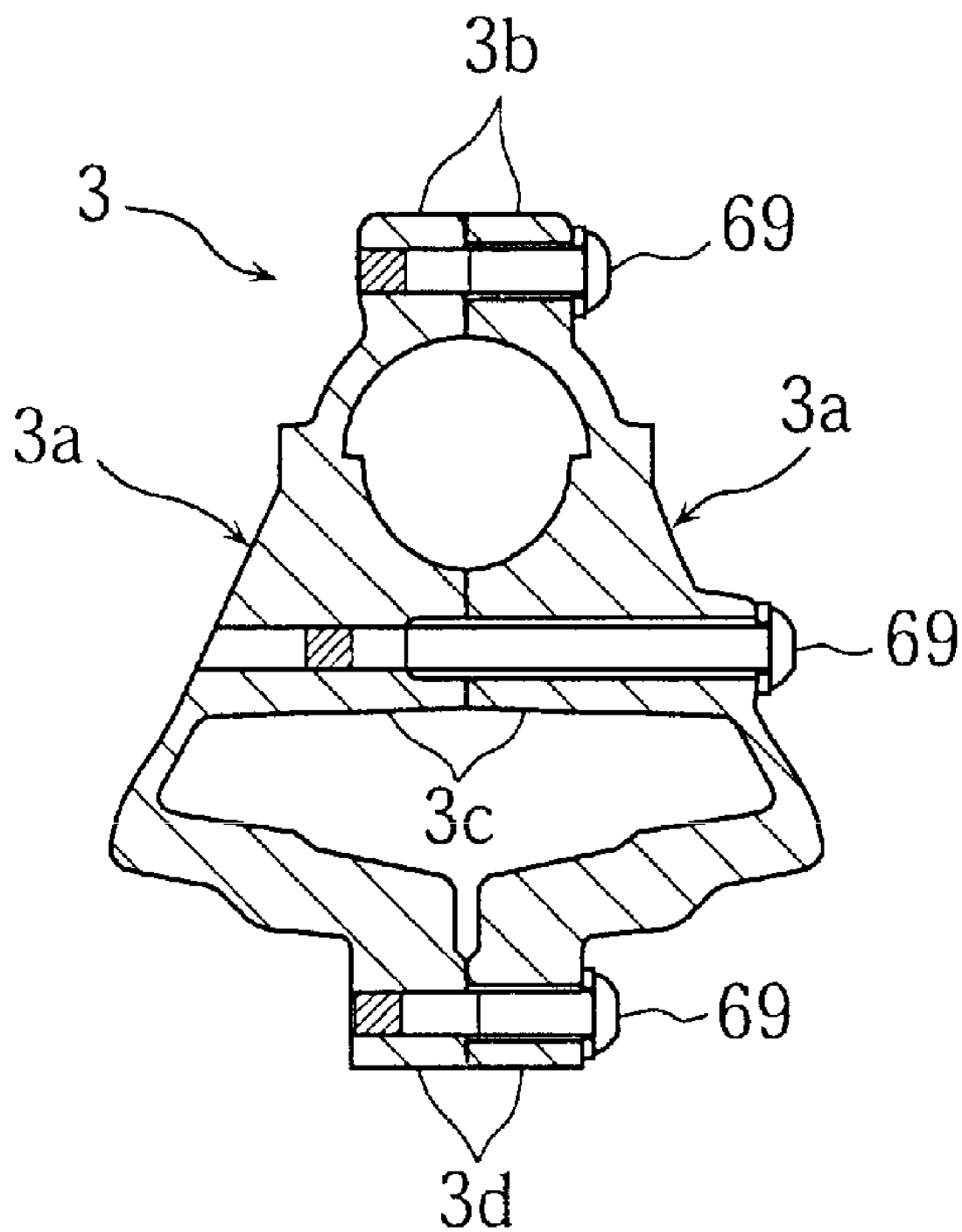
FIG. 7 is a sectional view of the head pipe (taken along the line VII-VIII FIG. 5).
Figure 8:
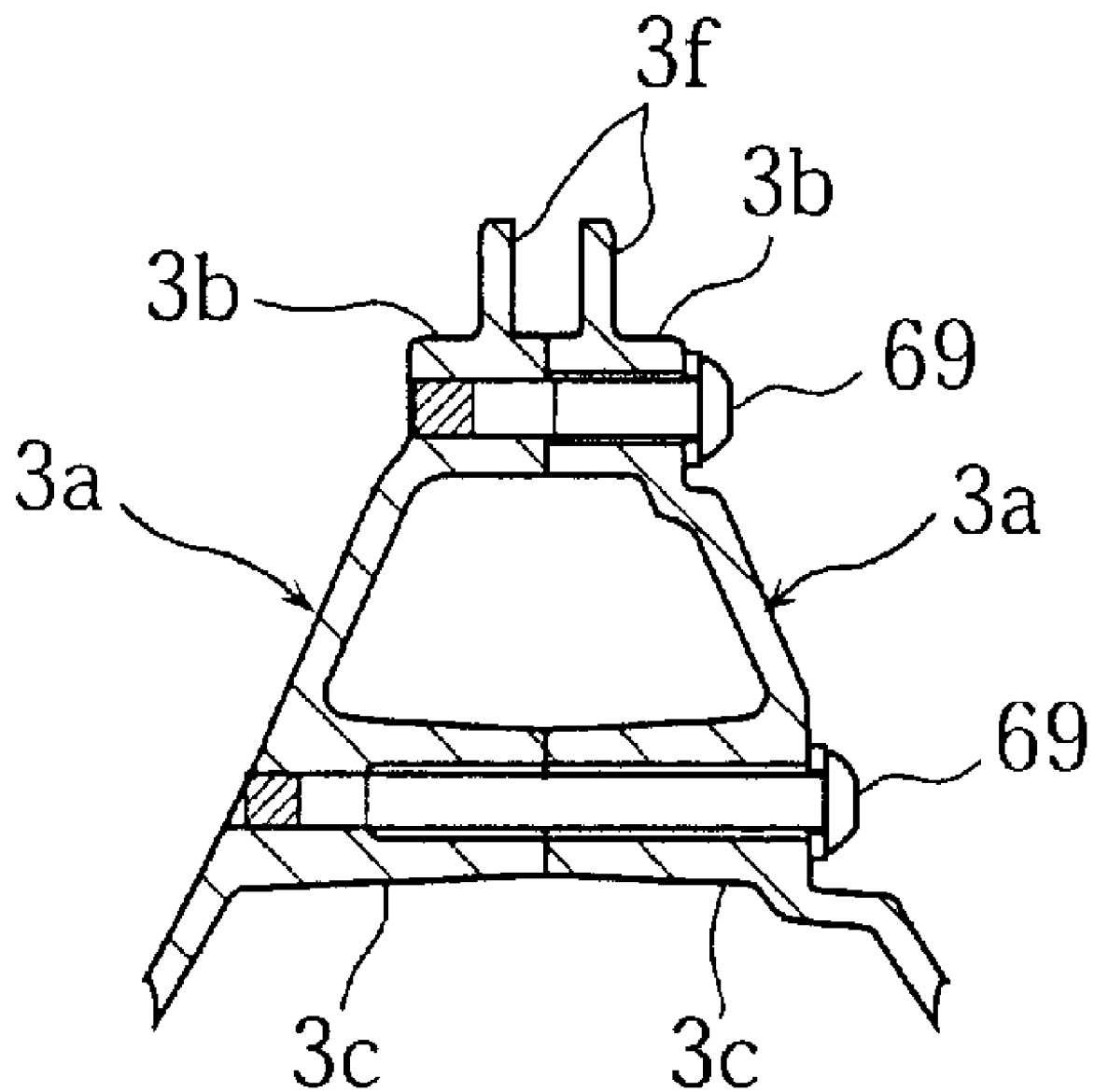
FIG. 8 is a sectional view of the head pipe (taken along the line VIII-VIII in FIG. 5).
Figure 9:
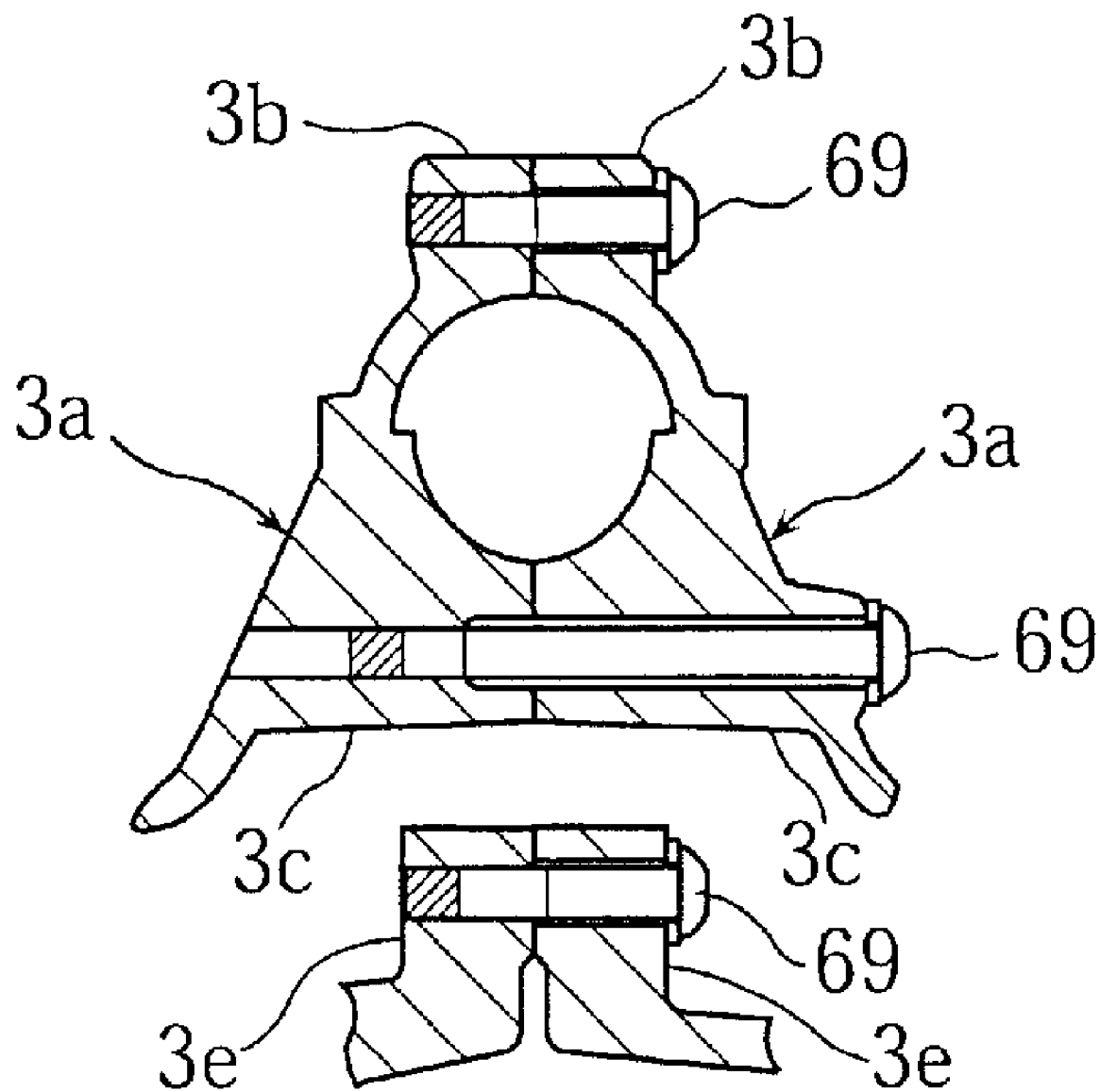
FIG. 9 is a sectional view of the head pipe (taken along the line IX-IX in FIG. 5).
Figure 13:
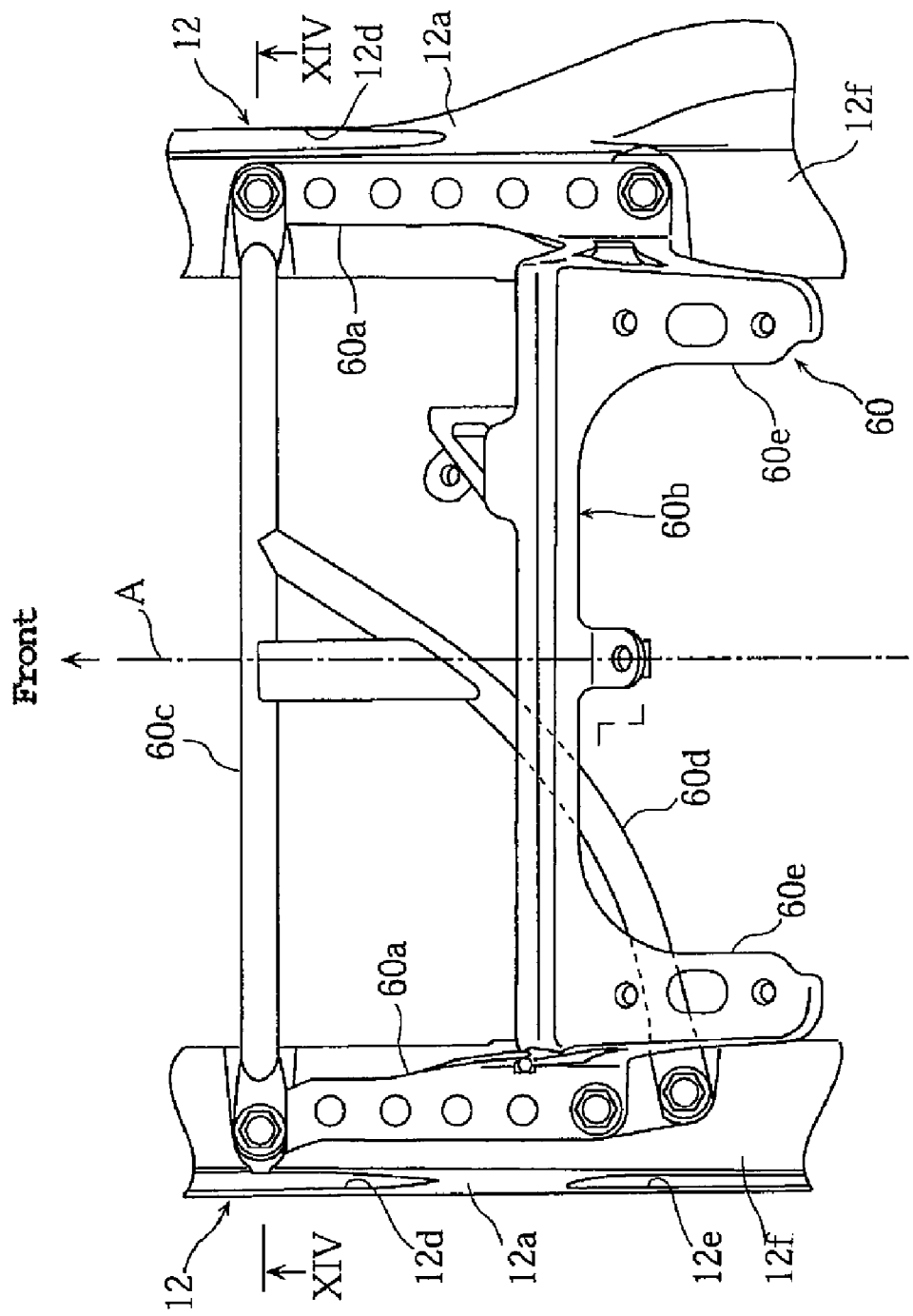
FIG. 13 is a plan view of a cross member of the front frame section.
Figure 14:
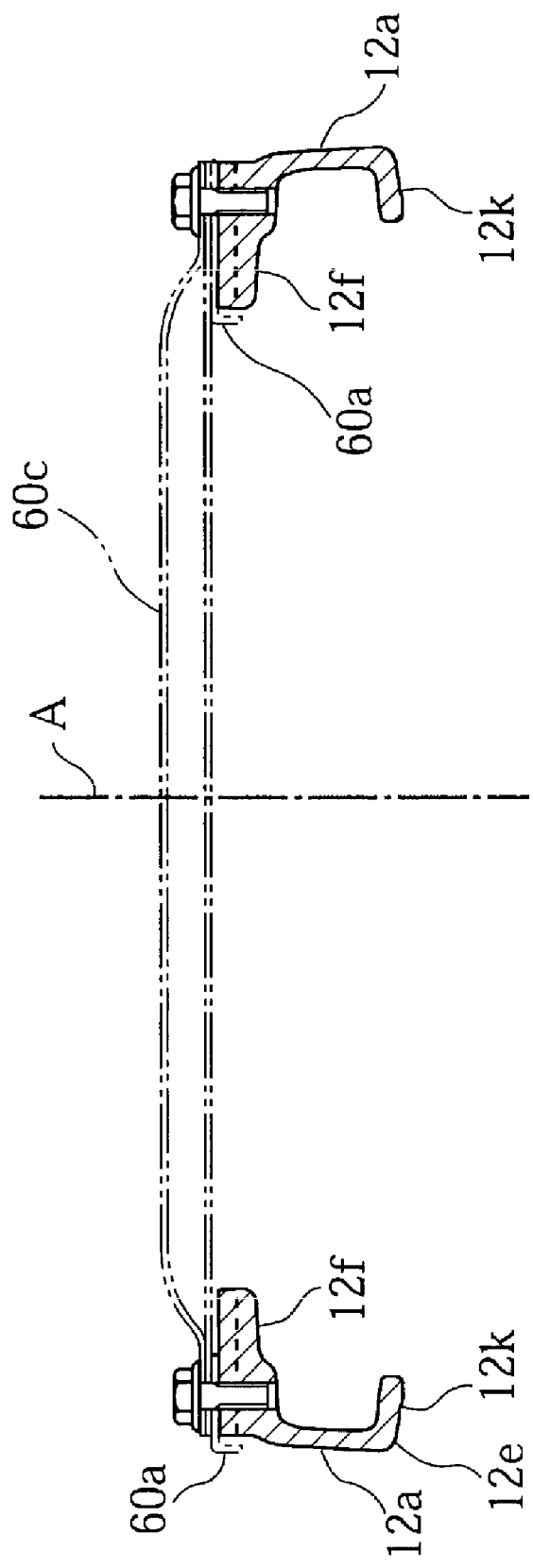
FIG. 14 is a sectional view of the cross member (taken along the line XIV-XIV in FIG. 13).

Upper parts of the upper edges of the left and the right side wall sections 12a, 12a located above the cylinder head 7c are interconnected by an upper cross member 60 extending in a vehicle-width direction (see FIGS. 4, 13 and 14). The upper cross member 60 includes: left and right leg sections 60a, 60a fixed on upper surfaces of the left and the right upper edge ribs 12f by bolting; a cross body 60b rising from the leg section 60a and extending upward for interconnecting rear ends of the left and the right leg sections 60a, 60a integrally; a cross pipe 60c for interconnecting front ends of the left and right leg sections 60a, 60a; and a connecting pipe 60d for connecting a center of the cross pipe 60c in a vehicle-width direction and a rear end of the left leg section 60a.

Left and right front ends of the fuel tank 11 are respectively fixed to left and right ends 60e, 60e of the cross body 60b by bolts.

Figure 18:
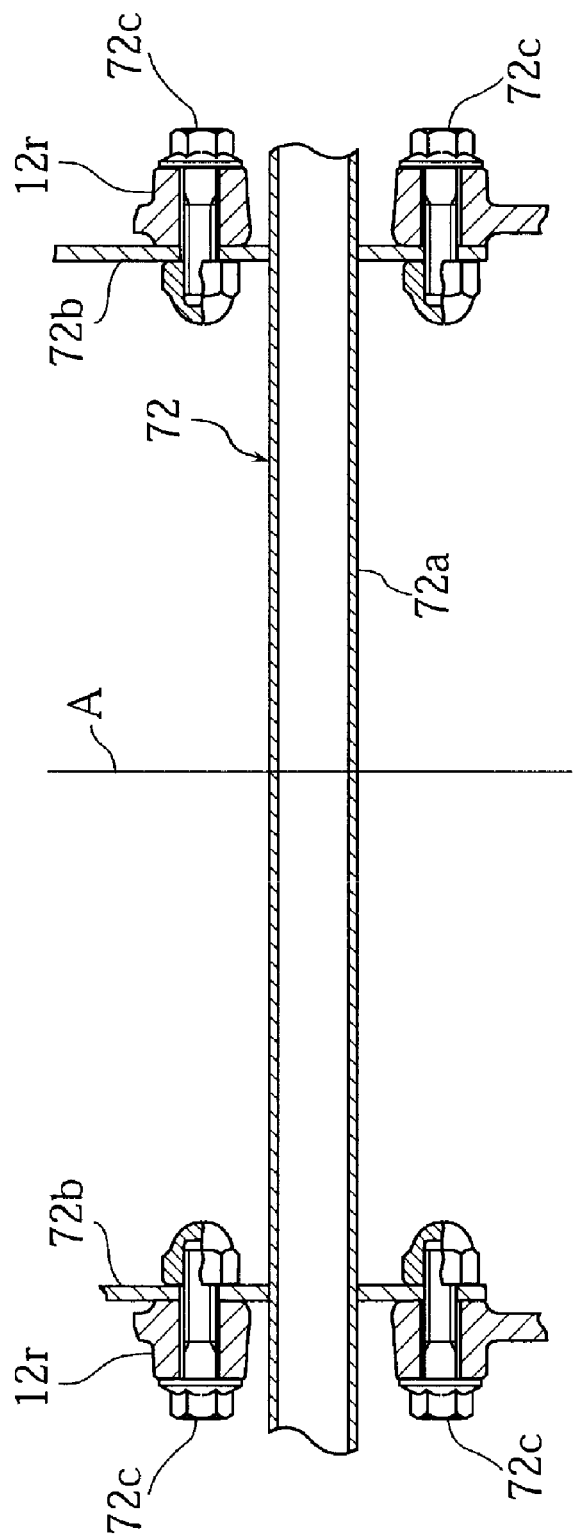
FIG. 18 is a sectional view of the cross member of the front frame section (taken along the line XVIII-XVIII in FIG. 4).

Lower parts of the lower edges of the left and the right side wall sections 12a, 12a located below the cylinder head 7c are interconnected by a lower cross member 72 extending in a vehicle-width direction (see FIGS. 4 and 18). The lower cross member 72 includes a lower cross pipe 72a extending in a vehicle-width direction and left and right radiator brackets 72b, 72b made of sheet metal and joined by welding to both ends of the lower cross pipe 72a. The left and the right radiator brackets 72b are fixed to left and right lower edge boss sections 12r of the left and the right side wall sections 12a, 12a by pairs of front and rear bolts 72c, 72c. Also, left and right footrest brackets 73, 73 are fixed on front sides of the left and right radiator brackets 72b of the left and the right side wall sections 12a, 12a by bolting or other suitable means.

The left and the right side wall sections 12a, 12a are covered with the leg shield (left and right cover members) 16. A space between the left or the right side wall sections 12a, 12a and the leg shield 16 defines a wind introduction passage 74 for introducing a headwind to the engine unit 7 (see FIG. 11).

A wind introduction member 75 including a sponge, etc., is disposed in the wind introduction passage 74 for guiding a headwind introduced into the wind introduction passage 74 from the forward side of the vehicle via front opening 12d through the rear side of the air cleaner 24 to the engine unit 7 (see FIG. 4). The wind introduction member 75 is attached to an inner wall of the leg shield 16 with an adhesive or the like so as to surround a rear edge of the front opening 12d.

Figure 16:
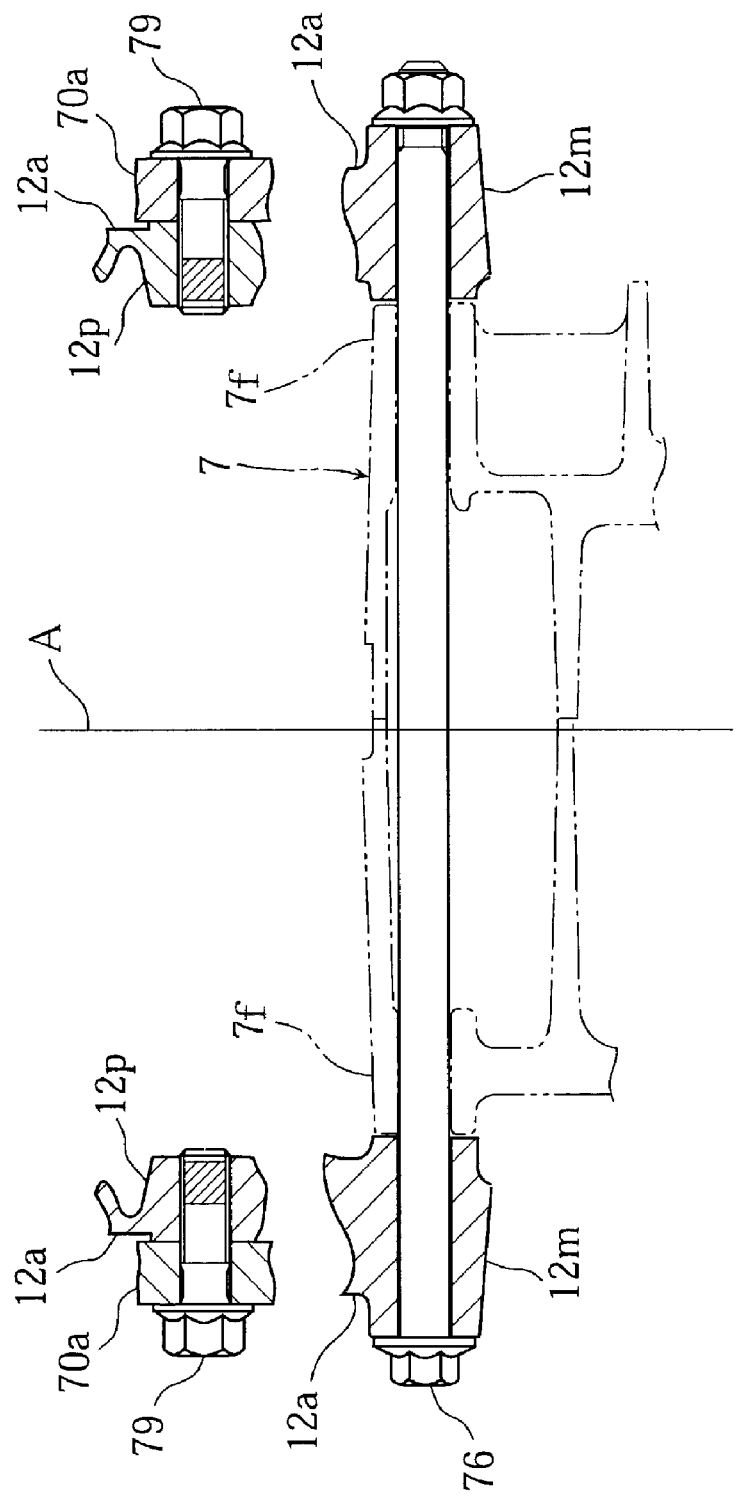
FIG. 16 is a sectional view of the engine suspension part of the front frame section (taken along the line XVI-XVI in FIG. 4).
Figure 17:
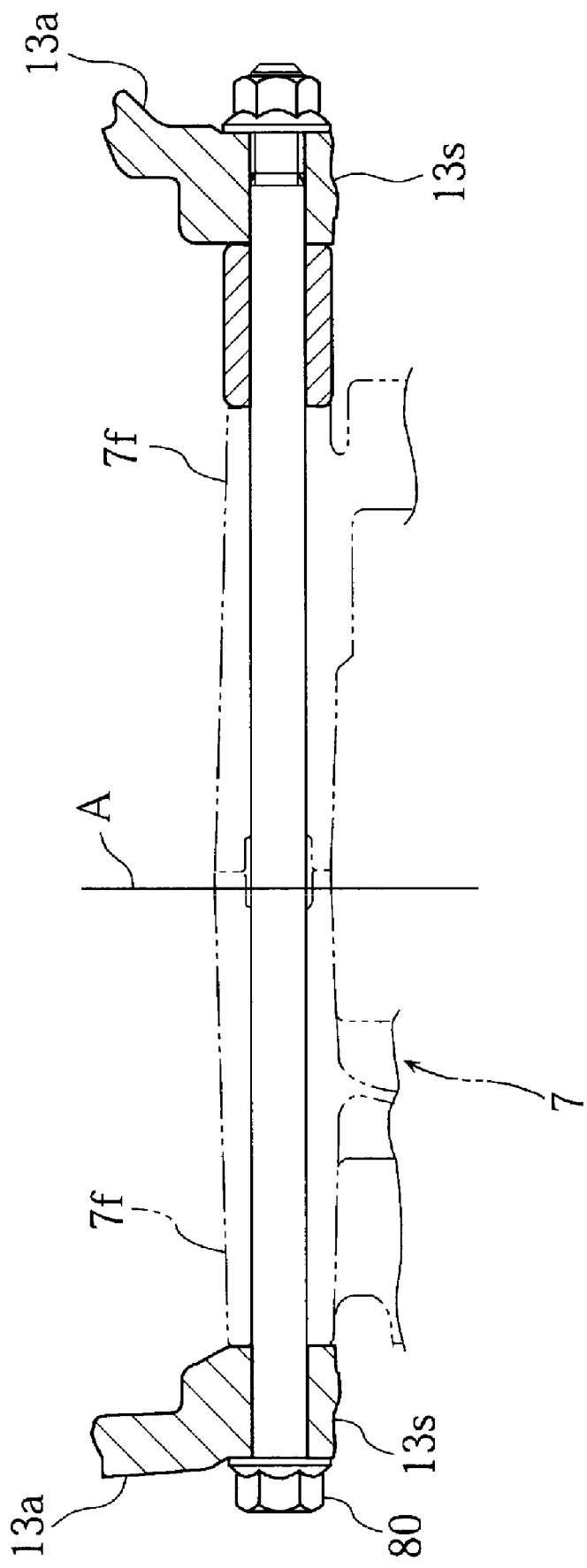
FIG. 17 is a sectional view of an engine suspension part of the rear frame section (taken along the line XVII-XVII in FIG. 4).

Left and right upper suspension boss sections 12m, 12m are formed at upper rear end edges of the left and the right side wall sections 12a, 12a. Upper suspension sections 7f, which are formed on an upper wall of the crankcase 7d of the engine unit 7, may be connected to the left and the right upper suspension boss sections 12m by bolts 76 (see FIGS. 4 and 16) or the like. The upper suspension section 12m is disposed more rearward than a connection boss section 12p.

Figure 15:
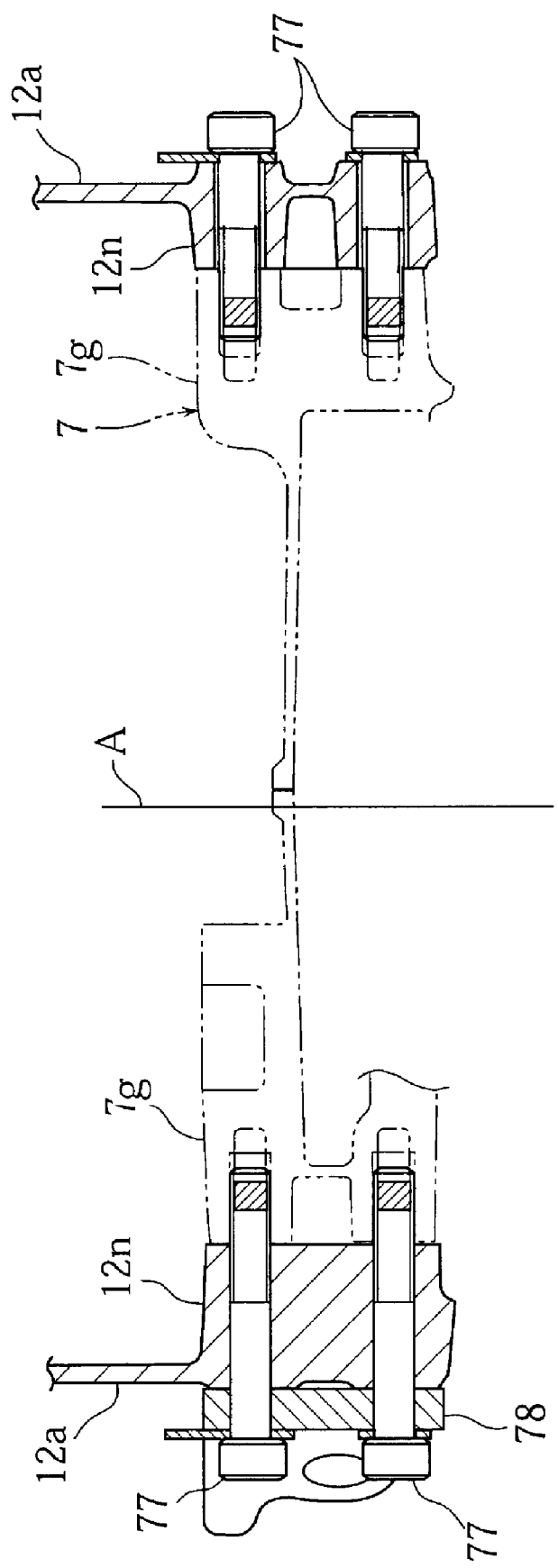
FIG. 15 is a sectional view of an engine suspension part of the front frame section (taken along the line XV-XV in FIG. 4).

Left and right lower suspension boss sections 12n, 12n are formed at lower rear end edges of the left and the right side wall sections 12a, 12a. Lower suspension sections 7g, which are formed on a bottom wall of the crankcase 7d of the engine unit 7, may be connected to the left and the right lower suspension boss sections 12n by pairs of front and rear bolts 77, 77 (see FIGS. 4 and 15) or the like.

On the outside of the left lower suspension boss section 12n, a side stand bracket 78 is fixed together therewith by bolts 77.

Thus, the left and the right frame sections 12 and the left and the right rear frame sections 13 are connected by interposing the engine unit 7 therebetween. As a result, the engine unit 7, which is a rigid body, is utilized as a part of the body frame 2.

According to an embodiment of the invention, the left and the right front frame sections 12, which extend obliquely downward rearward from the head pipe 3, have the left and the right side wall sections 12a, 12a extending in a longitudinal direction of the vehicle and in a vertical direction. Therefore, the left and the right side wall sections 12a, 12a have relatively wide surfaces extending in a longitudinal direction and in a vertical direction and thereby enhance surface rigidity of the left and the right side wall sections 12a, 12a. Accordingly, frame rigidity can be ensured without widening an interval between the left and the right frame sections 12, 12 in a vehicle-width direction. As a result, the size in a vehicle-width direction of a part of the vehicle in which the cylinder body 7e and the cylinder head 7c are disposed can be reduced. Because the footboards 19, 19 are disposed in the part that can be reduced in size in a vehicle-width direction, flexibility in arranging the foot board can be enhanced. Furthermore, size reduction in a vehicle-width direction makes the seat width smaller and allows the rider to put his or her feet on the ground in a more stable manner.

Also, the left and the right side wall sections 12a, 12a are disposed in the left and the right sides of the cylinder head 7c of the engine unit 7. Therefore, the engine unit 7 can be supported by the left and the right side wall sections 12a, 12a having a high rigidity, thereby enhancing the supporting rigidity of the engine unit 7.

In this embodiment, the engine unit 7 is suspended and supported by the upper suspension boss sections 12m and the lower suspension boss sections 12n respectively formed at the upper and the lower edges of the rear end of the left and the right side wall sections 12a, 12a having a high rigidity. Thereby, the supporting rigidity of the engine unit 7 can be enhanced.

In this embodiment, the upper edge rib 12f and the lower edge rib 12g are respectively formed on the upper edge 12a' and the lower edge 12a" of the left and the right side wall sections 12a, 12a. Therefore, torsional rigidity of the left and the right side wall sections 12a, 12a can be enhanced without widening an interval between the left and the right side wall sections 12a, 12a in a vehicle-width direction.

In the left and the right frames 12, 12 of this embodiment, a larger torsion load and bending load work thereon by the upper edges of the left and the right side wall sections 12a, 12a. In this embodiment, the upper edge rib 12f is formed longer than the lower edge rib 12g. This prevents the weight from increasing and enhances torsional rigidity of the left and the right side wall sections 12a, 12a.

The left and the right sides of the cylinder head 7c are covered by the rear part of the left and the right side wall sections 12a, 12a. Thereby, engine auxiliaries such as sensors or couplers disposed around the cylinder head 7c can be protected from external forces.

Also, the left and the right sides of the air cleaner 24 are covered by the left and the right side wall sections 12a, 12a. Thereby, the intake system including the air cleaner 24 can be protected from external forces.

Furthermore, in this embodiment, the front and the rear openings 12d, 12e are formed to have a relatively large opening area extending both in longitudinal and vertical directions. Therefore, the front and rear openings 12d, 12e can be utilized for maintaining the air cleaner 24 and the engine unit 7, and weight reduction of the frame can be achieved.

In this case, because the front and the rear peripheral ribs 12j, 12k are formed on the peripheries of the front and the rear openings 12d, 12e, respectively, and extend inward in a vehicle-width direction, decrease of frame rigidity can be prevented.

In this embodiment, the upper and the lower ribs 12h, 12i are formed to extend upward or downward continuously from inner edges of the upper and the lower edge ribs 12f, 12g of the left and the right side wall sections 12a, 12a. Therefore, rigidity of the portion of the side wall sections 12a proximal to the head pipe 3, and which bear a relatively large portion of the load of the left and the right front frame sections 12, may be enhanced.

In this embodiment, the top and the bottom wall sections 12b, 12c are formed on the connecting portions of the left and the right side wall sections 12a, 12a connected to the head pipe 3 so as to extend inward in a vehicle-width direction respectively from the upper and the lower edges of the left and the right side wall sections 12a, 12a so that the connecting portions have a generally square cylindrical cross section. Therefore, rigidity of the portion of the body frame immediately proximal to the head pipe 3, and which bears the largest load of the left and the right front frame sections 12, may be enhanced.

In this embodiment, the head pipe 3 and the left and the right front frame sections 12 are integrally formed by casting, thereby facilitating manufacturing thereof and reducing the overall number of parts.

Also, in the illustrated embodiment, the head pipe 3 is formed by the left and the right pipe halves 3a, 3a, which are preferably integrally formed and connected to the left and the right front frame sections 12, respectively. The left and the right pipe halves 3a may be coupled by bolting or other suitable fastening means. This facilitates manufacturing of the head pipe and reduces the overall number of parts.

The left and the right front coupling boss sections 3b and the left and the right rear coupling boss sections 3c, which are respectively formed at front and the rear edges of the left and the right head pipe halves 3a, are coupled together by coupling bolts 69. Therefore, coupling strength of the left and the right head pipe halves 3a may be ensured. Also, alignment precision between the left and the right head pipe halves 3a can be enhanced compared to coupling by welding.

The upper and the lower separated coupling boss sections 3d, 3e are formed at the upper and the lower edges of parts spaced rearward from the left and the right rear coupling boss sections 3c of the left and the right side wall sections 12a, 12a and coupled together by the bolts 69 so that a part of the body frame from the upper and the lower separated coupling boss sections 3d, 3e to the rear coupling boss sections 3c has the square cylindrical shape discussed above. Therefore, rigidity of the portion of the body frame immediately proximal to the head pipe 3, which bears the largest load of the left and the right front frame sections 12, may be enhanced.

In this embodiment, the leg shield 16 is disposed on the outside of the left and the right side wall sections 12a, 12a and spaces between the leg shield 16 and the left and the right side wall sections 12a, 12a are defined as the wind introduction passages 74 for introducing a headwind to the engine unit 7. Therefore, the space is utilized to form the wind introduction passage 74 and thereby enhances the cooling efficiency of the engine unit 7.

Also, the wind introduction member 75 is disposed in the wind introduction passage 74 for guiding a headwind introduced into the wind introduction passage 74 via front opening 12d to the engine unit 7. Therefore, the cooling wind delivered to the engine unit 7 can be intensified, thereby enhancing the cooling efficiency of the engine unit 7.

The wind introduction member 75 is attached to an inner wall surface of the leg shield 16 with an adhesive or the like. Thereby, a simple attachment configuration can be realized.

In this embodiment, the upper and the lower edges of the left and the right side wall sections 12a, 12a are respectively connected together with the upper and the lower cross members 60, 72 extending in a vehicle-width direction. Therefore, rigidity of the left and the right front frames 12 in a vehicle-width direction can be enhanced.

Upper and lower cross members 60, 72 having a high rigidity can also be utilized to mount the heavyweight fuel tank 11 and radiator (not shown) thereon.

In the embodiment, the left and the right head pipe halves 3a are formed integrally with the left and the right side wall sections 12a, 12a, respectively. However, in other embodiments, the head pipe may be formed integrally with either of the left and the right side wall sections, or both.

While an embodiment has been described in connection with the figures hereinabove, the invention is not limited to this embodiment, but rather can be modified and adapted as appropriate. Thus, it is to be clearly understood that the above description was made only for purposes of an example and not as a limitation on the scope of the invention as claimed below.

What is claimed is:

1. A motorcycle, comprising:
    a body frame including a head pipe positioned at one end of said body frame, a pair of front frame sections comprising opposing side wall members extending substantially obliquely rearward and downward from said head pipe, and a pair of rear frame sections extending substantially rearward and upward from said opposing side wall members;
    a front fork having a front wheel at a lower end, a handlebar at an upper end, and a steering shaft interposed between the two, said steering shaft being operatively inserted through and supported by said head pipe; and
    an engine unit mounted to said body frame so that a portion of said engine unit is disposed between said opposing side wall members in a region where said opposing side wall members extend substantially obliquely rearward and downward and a portion of said engine unit extends aft of said opposing wall members in the longitudinal direction of the vehicle, said engine unit being operatively coupled to a rear wheel and including an engine body supported by said wall members so that an axis of a cylinder of the engine unit extends generally in the longitudinal direction of the vehicle between the wall members.

2. The motorcycle of claim 1, wherein said body frame comprises an underbone frame.

3. The motorcycle of claim 1, wherein said body frame is surrounded by a vehicle body cover.

4. The motorcycle of claim 3, wherein said vehicle body cover includes a front cover which extends over the left, right and front sides of said front fork.

5. The motorcycle of claim 4, wherein said vehicle body cover also includes a leg shield disposed at the rear of said front cover.

6. The motorcycle of claim 5, wherein said vehicle body cover further includes left and right side covers arranged to cover left and right side portions of said engine unit, and left and right under-covers arranged to cover a lower edge of said left and right side covers, respectively.

7. The motorcycle of claim 6, further comprising low-profile left and right footboards which form the footrests for a rider, wherein said footboards are disposed between said side covers and said under covers.

8. The motorcycle of claim 7, wherein said footboards are disposed between said left and right side covers and said left and right under-covers.

9. The motorcycle of claim 7, wherein said footboards are positioned on the left and right sides of said cylinder.

10. The motorcycle of claim 9, wherein a portion of said vehicle body cover between said left and right footboards swells upward in a generally tunnel shape to form a center tunnel section.

11. The motorcycle of claim 1, wherein said head pipe and said pair of front frame sections comprise one or more castings.

12. The motorcycle of claim 11, wherein said head pipe includes opposing left and right head pipe halves formed integrally with an opposing side wall member.

13. The motorcycle of claim 12, wherein said left and right head pipe halves are coupled together via bolts.

14. The motorcycle of claim 1, wherein at least a portion the engine unit is interposed between the pair of front frame sections and the pair of rear frame sections.

* * * * *